United States Patent Office 2,875,591
Patented Mar. 3, 1959

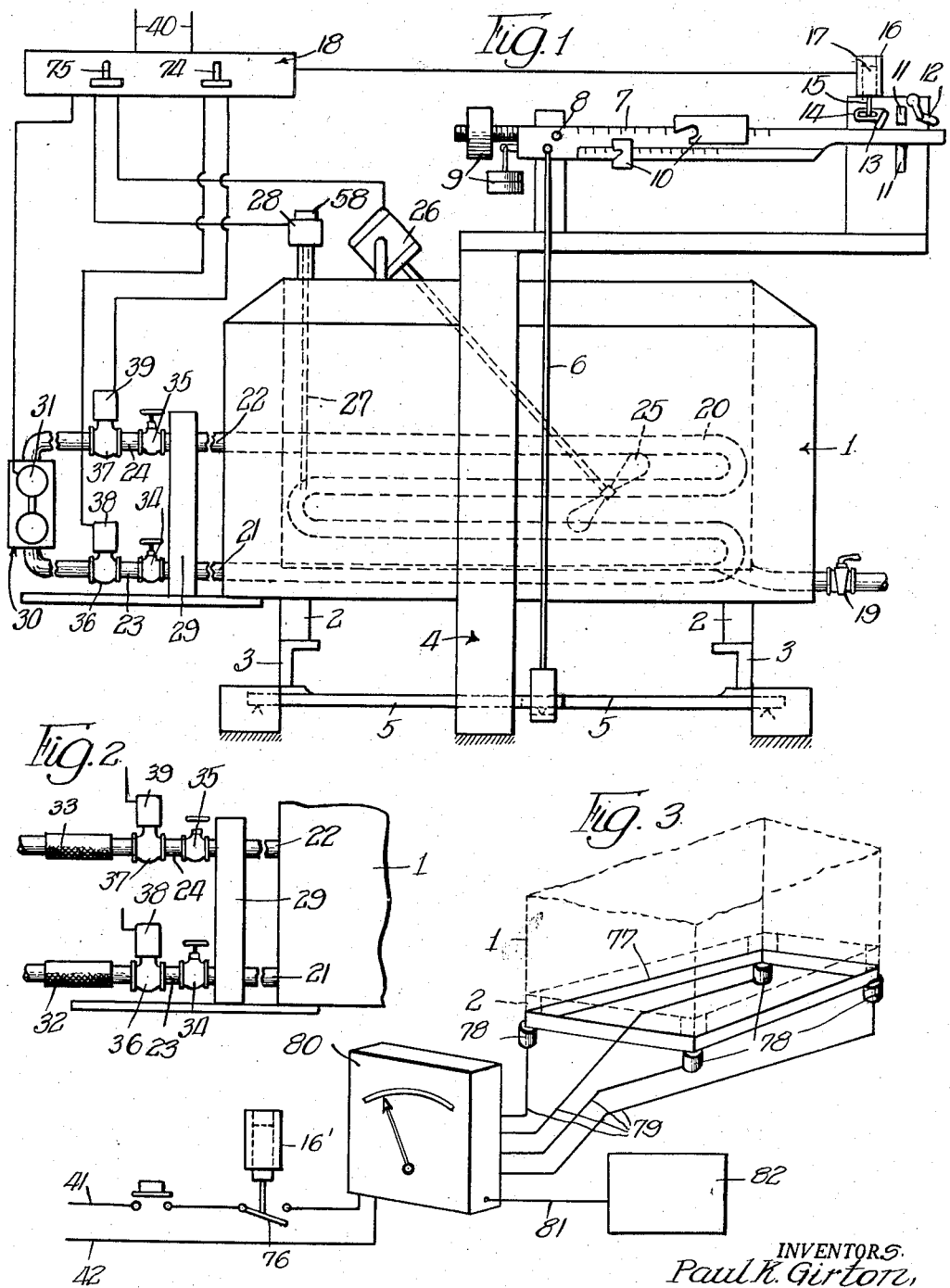

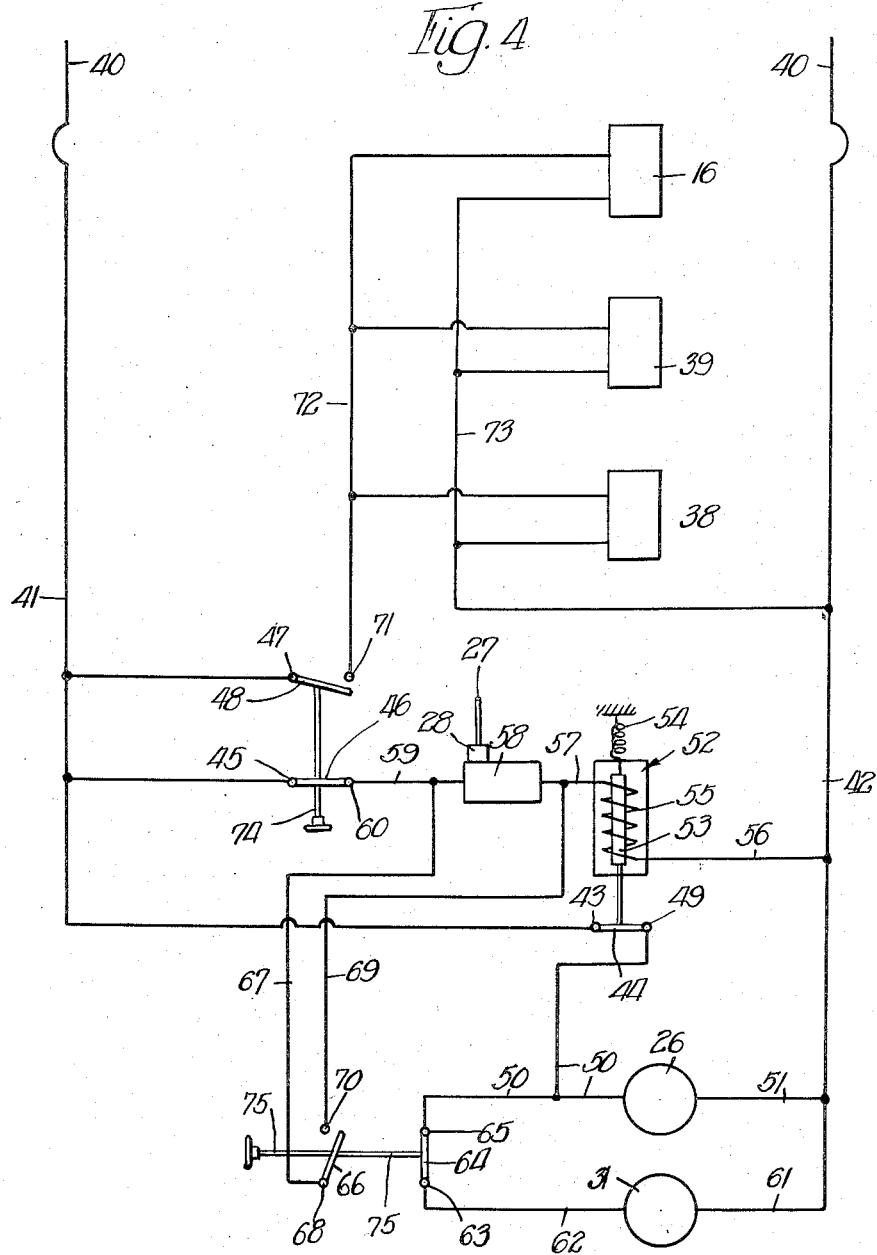

2,875,591

APPARATUS AND METHOD FOR ATTEMPERING, STORING, AND WEIGHING

Paul K. Girton, Millville, and Darl L. Evans, Bloomsburg, Pa., assignors to Girton Manufacturing Company, Inc., Millville, Pa., a corporation of Pennsylvania Application October 5, 1956, Serial No. 614,269

29 Claims. (Cl. 62—98)

This invention pertains to improvements in apparatus and method for attempering, storing, and weighing. More particularly stated, this invention relates to improvements in combined and interacting apparatus for attempering, as for example, refrigerating, and storing, and weighing fluid products, as for example milk, or other fluids or readily mixable and flowable materials, and to the method of operation of the improved device.

This invention also relates to the novel structural features, controls, and mode of interacting operation of the refrigerating or attempering, storing, and weighing portions of the improved apparatus whereby to enable the accurate determination of the net weight of the refrigerated product contained in the storage chamber at a selected time, and to enable the accurate sampling of the weighed product.

The copending application Serial No. 614,268, filed October 5, 1956, pertains to a somewhat similar invention.

In the production and processing of various products, as for example certain dairy products such as milk, it is common practice to accumulate and store such milk in refrigerated vats or tanks pending the sale of the milk by a producer to a processor. The perishable nature of the milk requires good refrigeration and sanitary conditions. The sales price of such milk is commonly based on the weight or quantity of the milk and by the milk fat content thereof as determined from well selected and uniform samples of the milk.

The vats or tanks or similar refrigerated receptacles commonly used for the storage of the fluid, such as milk, are frequently provided with lower walls or bottom sections which are inclined toward an outlet or drain connection to facilitate the drainage of the fluid from the vat or receptacle.

To measure or determine the quantity or weight of the fluid stored in the receptacle or vat, it is common practice, as for example in the dairy industry, to use a so-called "dip stick" which has been suitably graduated and which, when used at a predetermined station in the vat, may be used to measure the depth of fluid in the vat at that station. From such measurement the volume or the weight of the fluid content of the vat may then be determined. Obviously, such a procedure contemplates the correct calibration or graduation of the so-called measuring or "dip stick" as well as the accurate positioning of the "dip stick" at a predetermined station in the receptacle at the time of making the measurement, the support of the measuring stick at a predetermined relationship with respect to a vertical position of the measuring stick, and the accurate reading of the calibrations on the "dip stick" to determine the depth of the product in the vat. In view of the fact that many of storage vats or receptacles are of appreciable size it becomes economically necessary in the use of such old yet common practices for both the purchaser and the seller of the product to be assured that the determination of the depth of the product in the vat has been extremely accurate.

The storage vats or receptacles used for the storage of such product are commonly refrigerated by the use of a direct expansion type refrigeration system which may be of the central plant type, from which central refrigeration plant the refrigerant is supplied to the vat, or the refrigeration system may be of the so-called "self contained unit" type frequently carried by the vat.

In some instances, instead of determining the volume or quantity of the fluid stored in the vat before withdrawing the fluid from the vat, a measuring or metering device is used in connection with the vat draining or emptying procedure. For certain types of fluid such metering devices may be satisfactory. However, for some fluids, such for example as milk and the like products which have a tendency to foam, or which include considerable quantities of entrained gas, a metering device is not wholly satisfactory for the reason that the metering device cannot detect and make adjustments for the entrained foam or gas flowing with the milk or like fluid, with the net result that, due to the passage of foam or entrained gas with the milk or other fluid through the meter, the meter will incorrectly indicate the passage of more product through the meter than did actually pass through the meter.

To avoid the problems and difficulties inherent in the use of a graduated measuring stick or "dip stick" and to avoid the problems inherent in the use of meters for measuring the quantity or weight of discharge fluid, which fluid frequently contains considerable quantities of entrained gas or foam, and to enable the quick, direct, accurate and convenient determination of the net weight of the product, it appears that an arrangement for weighing the product stored in the vat is most desirable. However, when such a vat comprises an attempering type of vat, for example a cooled vat, wherein the cooling medium is a circulating volatile refrigerant, it becomes necessary to provide an arrangement whereby to automatically avoid discrepancies in the determination of the weight of the fluid which discrepancies may result from the evaporation or continued circulation of the refrigerant through the cooling coils or passages of the vat during the period of determination of the weight of the product stored in the vat.

The weight of the volatile refrigerant which may possibly evaporate from the cooling coils or refrigerant passages in a storage vat of the type contemplated by this invention and the passage of such evaporated refrigerant to the compressor after the initial weighing of the filled vat or tank during the period while cooled product is being drained from the vat or tank and before the empty vat can be weighed again to enable the determination of the net weight of the removed product, may amount to several percent of the net weight of the cooled product. Such loss of weight due to the shifting of refrigerant from the vat to the compressor and condenser is of special importance in those instances where refrigerant is supplied from a central refrigeration plant, or from a refrigeration unit which is not mounted on the vat.

Similarly, the continued operation of compressor motors or pump motors in self contained type of units mounted on the refrigerated vats has been found to have an objectionable effect on the operation of weighing devices which may result in inaccurate determination of the weight of the product.

It is, therefore, an object of this invention to provide a new and novel and useful improvement in apparatus and method for handling fluids, such as milk and the like, or other flowable materials wherein the fluid or material may be accumulated and stored, refrigerated or attempered under accurately controlled conditions, blended, sampled, and accurately weighed.

A further object of this invention is to provide improved vat type apparatus for the refrigerating or attempering, storing, and weighing of fluid in an attempered or refrigerated apparatus wherein there has been obviated the possible adverse effect, of the evaporation and/or circulation of the attempering medium used for the attempering of the product in the vat, or of the vibrations caused by operating of pump or compressor motors.

A still further objective of this invention is to provide an automatic arrangement for the controlled and synchronized interaction of the attempering system blending device and weighing device of the improved combined storage, attempering, blending and weighing apparatus, whereby the weighing device is locked in inoperative position until the circulation of the attempering medium in the attempering medium passages of the vat portion of the apparatus is discontinued and whereby the circulation of the attempering medium in the vat or the supply of attempering medium to the vat or the escape of attempering medium from the vat is prevented while the weighing operation is in process.

The foregoing and other objectives, important novel operational and structural features and advantages of this invention, will become more apparent and be more easily understood upon examination of the following description thereof and the accompanying drawings and the appended claims. It should, however, be understood that, without desire of limitation, the invention will be described and illustrated as the preferred embodiment of the invention in a refrigerated storage and weighing tank for milk. Certain changes and variations may suggest themselves to those skilled in the pertinent arts, which changes may not, however, depart from the spirit of this invention and may come within the scope of the appended claims.

In the accompanying drawings:

Figure 1 is a front elevational view, showing diagrammatically a mechanical scale supporting a refrigerated type vat having a self-contained refrigerating unit and control mechanism to fulfill the stated objectives of the invention;

Figure 2 is a fragmentary front elevational view showing a modified arrangement for controllably supplying refrigerant to the refrigerated vat from a separate refrigerating unit;

Figure 3 is a perspective view, partially broken away, diagrammatically showing an electronic type of scale supporting the refrigerated vat; and Figure 4 is a schematic showing of an electric wiring diagram of the improved device.

Referring to the drawings, in which like elements are identified by like numerals, and describing the invention, without desire of limitation, as an embodiment in a cooling, storing, blending, and weighing device for milk, 1 represents the refrigerated, open top or atmospheric type of storage chamber or weigh tank for confining milk, having support elements 2 resting upon the supporting members or platform members 3 of a mechanical lever type scale 4. In the conventional manner respecting lever type weighing scales, the weight or downwardly exerted force of the tank 1 is transmitted at least in part through levers 5 and linkage 6 to the weight indicator or balance beam 7. Beam 7 is pivoted to the vertical framework of the scale at 8 and is in turn provided with the conventional adjustable counterweights 9 and adjustable poise elements 10.

In the conventional manner the load sensitive or weighing device or scale 4 is provided with stops or restraining or inactivating elements 11 carried by the vertical framework of the scale 4 to limit the oscillation of the weight indicator or balance beam 7. An eccentric and manually operable and conventional crank arm type beam lock or beam inactivator 12 is positioned adjacent to one side of the stop means 11 and when adjusted into locking position will securely lock beam 7 against oscillation. Also carried by the frame of the weight sensitive device or scale 4, and positioned to the opposite side of the stops 11 is a second pivotally mounted crank arm type beam lock 13 which is operably connected by linkage 14 to the vertically movable armature stem 15 of the electromagnetic solenoid type beam lock actuator solenoid 16 also carried by the frame of scale 4. The connection of the linkage 14 and the armature stem 15 is such that the downward gravitational movement of the armature 17 of solenoid 16 will normally pivot the beam lock or restraining device 13 into beam locking position, in which position the one end of the beam 7 is securely held against a beam stop 11 when the solenoid 16 is not energized. Energization of the prime mover solenoid 16 will lift the armature 17, thereby, through linkage 14, pivoting lock 13 into beam unlocking position. Electric power is supplied to solenoid 16 through a suitable cable from control box 18 housing the desired controls and switches, hereinafter to be described with respect to the wiring diagram of Figure 4, for the distribution and control of power secured from the power source 40.

The tank or confining container 1, if desired, may be provided with a valved discharge connection 19, and is provided with refrigerant passage 20 which, if desired, may, as illustrated in Figure 1 of the drawings, be built into the lower surface and/or side walls of the tank 1. The refrigerant passage 20, which does not communicate directly with the product space in container 1, has an inlet end or connection 21 and an outlet end or connection 22 connected respectively to refrigerant supply conduit 23 and refrigerant discharge conduit 24 for the supplying of refrigerant to and the discharge of refrigerant from the passages 20 through which passages refrigerant is circulated for the purpose of cooling the content of the product compartment of the tank or container 1 by indirect heat exchange between the refrigerant and the product.

An agitator or blender 25 extends into the product compartment of vat 1 and is adapted for use in the uniform mixing of the contents of the vat and for circulation of the contents of the vat over the refrigerated heat exchange surfaces to facilitate cooling of the product. Agitator 25 may be supported by the agitator driving motor 26 mounted on tank 1.

A thermal or sensing unit 27 extends into the product compartment of vat 1 for sensing the temperature of the product, and is operatively connected to an electric switch or control unit 28 responsive in its operation to the thermal unit or sensing unit 27.

A vertically arranged refrigerant accumulator or surge tank 29 is operatively connected at its upper end to the low pressure refrigerant discharge conduit 24, with the conduit 24 communicating directly with the upper interior portion of the surge tank 29. The conduit 23 for supplying high pressure refrigerant to the passage 20 similarly communicates with the lower interior portion of the surge tank 29 and may be provided interiorly of the tank 29 with a jet type refrigerant recirculating pump (not shown) for recirculating into passage 20, refrigerant accumulated in the lower portion of the surge tank 29. The low pressure volatilized refrigerant discharged from passage 20 is conducted by conduit 24 to a compressor-condenser unit 30, powered by electric motor 31. From the compressor-condenser unit the compressed high pressure refrigerant is supplied to conduit 23.

The compressor-condenser unit 30 for circulating the attempering medium or refrigerant through passage 20 may be of the commonly known self-contained type and may be carried by the storage vat 1 as illustrated in Figure 1 of the drawings. However, in certain instances, and for certain applications, it may be desired to connect the refrigerant or attempering medium supply and discharge conduits 23 and 24 respectively to a central general purpose refrigeration unit, in which latter instance, to avoid interfering with the operation of scale 4, the conduits 23 and 24 may be provided with flexible connection elements 32 and 33 respectively as shown in Figure 2, for connecting the conduits 23 and 24 to refrigerant supply and discharge pipes.

To permit the manual control of the flow of refrigerant through the conduits 23 and 24 or to trap refrigerant in passage 20, conduits 23 and 24 are provided with manually operable valves 34 and 35 respectively. Similarly, to permit the automatic control of the flow of refrigerant through the conduits 23 and 24 or to trap refrigerant in passage 20, conduits 23 and 24 are provided with normally open refrigerant supply and refrigerant discharge or flow control valves 36 and 37 respectively. Valves 36 and 37 are actuated automatically by electromagnetic actuator or prime mover solenoids 38 and 39 respectively between open and closed or flow control positions. Valves 36 and 37 may be of a construction wherein such conventional arrangements as springs are used to normally hold the valves open and in which the actuators 38 and 39 close the valves against the action of such springs.

Power is supplied to the motors 26 and 31 and to the actuators 38 and 39 through suitable cables connecting these devices with the source of electrical power in switch box 18.

Figure 4 is a wiring diagram, of the electrical system for the device of Figure 1. According to that diagram the electrical power may be supplied from a suitable source 40, such as the conventional city electrical supply circuit, having two wires 41 and 42. The line 41 of the circuit 40 is connected to the terminal 43 of a first switch 44 and to terminal 45 of a second switch 46 and to terminal 47 of a third switch 48. The terminal 43 of switch 44 is paired with the opposite terminal 49 connected to line 50 leading to one side of the circuit of the agitator motor 26. The opposite side of the circuit of motor 26 is connected by line 51 to the power line 42 thereby completing a circuit for line 41 to line 42 through agitator motor 26 and switch 44, when switch 44 is closed.

Switch 44 is of the normally open type and is actuated by switch actuator relay 52. Armature 53 of relay 52 is operatively linked to switch 44, and is normally supported by spring 54 in such a manner that the switch 44 is normally open. Upon the energizing of the coil 55 of relay 52, armature 53 is drawn downwardly, as illustrated, to close the switch 44. One end of the coil 55 is connected by line 56 to power line 42 while the opposite end of coil 55 is connected by line 57 to one side of a fourth switch 58 which is responsive to the thermal sensing unit 27 connected to control unit 28 and which is automatically opened upon the sensing of a predetermined temperature by the thermal unit 27. The opposite side of switch 58 is connected by line 59 to terminal 60 paired with terminal 45 in switch 46.

The circuit of compressor motor 31 is connected at one side by line 61 to power line 42. The opposite side of the circuit of motor 31 is connected by line 62 to terminal 63 of a fifth and normally closed switch 64. Terminal 63 is paired with terminal 65 which is in turn connected to line 50 thereby, through switch 64, connecting motors 26 and 31 in parallel.

A sixth switch 66 which may be referred to as a jump or by-pass switch is connected parallel to the thermal unit responsive switch 58 by lines 67 and 69. Line 67 is connected between the terminal 68 of switch 66 and line 59 to one side of switch 58. Line 69 is connected at one end to line 57, on the opposite side of switch 58, and is also connected to terminal 70 of switch 66 which terminal 70 is paired with terminal 68 of switch 66.

Terminal 71 of the switch 48 is connected to line 72 which is in turn connected to one side of each of the coils of each of the solenoids 16, 38 and 39. The opposite side of each of those coils of those power responsive prime mover solenoids 16, 38 and 39 are in turn connected to line 73 which line 73 is connected in turn to the power line 42.

As illustrated in Figure 4, switches 46 and 48 are opposite acting and manually operable switches preferably joined by a common actuator handle 74. Similarly, switches 64 and 66 are opposite acting and manually operable switches joined by a common actuating handle 75. As illustrated in Figure 1, switches 44, 46, 48, 64 and 66 are preferably housed in switch housing 18.

In the operation of a device embodying the present invention in the form as diagrammatically illustrated in Figure 1, wherein a self-contained refrigeration system is carried by the vat 1, mounted on the scale 4, the liquid, such as milk, to be stored, cooled, blended, and weighed is supplied into the storage compartment of the milk storage tank 1. In many instances such milk may be relatively warm or at least it soon requires refrigeration whereupon the switch 58, responsive to the temperature sensing element 27, is closed due to the fact that the temperature of the milk is in excess of the desired temperature. Thereupon, to commence the cooling operation, handle 75 is actuated to close switch 64, whereby to connect compressor motor 31 parallel to agitator motor 26. Upon actuation of handle 74, to close switch 46, electric power flows from line 41 through a power control circuit including switch 46 conductor 59 thermal responsive switch 58 conductor 57, solenoid coil 55 of the relay type switch actuator 52 and conductor 56 to line 42, thereby energizing coil 55. Upon such energizing of coil 55, the armature 53 of switch actuator 52 is magnetically drawn downwardly against the tension spring 54 and urges downwardly the linkage joining the armature 53 in the switch element 44 whereby to close switch 44. When switch 44 is thus closed electric power flows through line 41 and through a power circuit including switch 44 line 50 agitator motor 26 and line 51 and power line 42 to complete a circuit. The condenser motor 31 connected parallel to the agitator motor 26 simultaneously receives a flow of current from line 50 through switch 64 line 62 compressor motor 31 and line 61 connected to power line 42.

With switches 44, 46, 58 and 64 closed, to establish the described control and power circuits, the compressor motor 31 and agitator motor 26 continue to respectively drive the refrigerant compressor to circulate refrigerant through passage 20 and to drive the agitator 25 to agitate and blend the milk contained in vat 1.

As soon as the temperature of the milk is reduced to the desired temperature, the temperature sensing element 27 actuates switch 58 to open that switch thereby opening the electric circuit resulting in the de-energization of the solenoid coil 55 of switch actuator 52, whereupon the tension spring 54 raises armature 53 and through the connecting linkage opens switch 44. When switch 44 is thus opened the circuit supplying power to the motors 26 and 31 is broken and the motors stopped with the resulting stoppage of the pumping of refrigerant by the compressor unit into passage 20 and with the resultant stoppage of the agitator 25.

As soon after the stopping of the motors 26 and 31 as the sensing element 27 senses a predetermined increase in the temperature of the milk in vat 1, the switch 58 is again closed responsive to the element 27 with the resulting re-energization of the relay type actuator 52 and the closing of switch 44 to re-energize motors 26 and 31 in the hereinbefore described manner to thereby recommence the cooling and agitating operations to further cool and agitate the milk in vat 1.

Such cyclical refrigeration operation, as has just been described, continues, until it is determined to weigh the cooled milk, at which time handle 75 is moved to open switch 64 and close switch 66 thereby breaking the power circuit to compressor motor 31 and thereby by-passing the thermal responsive switch 58. Under such circumstances the agitator motor 26 will continue to operate without the operation of the compressor motor 31. The operation of agitator motor 26 is continued for a desired or required period of time to assure the securing of the desired blending of the milk in the vat 1 to permit securing of good uniform samples of the stored milk for testing. When such samples have been secured, handle 74 is moved to open switch 46, thereby de-energizing solenoid coil 55 with the resultant opening of switch 44 and the breaking of the power circuit to motor 26. Simultaneously, with the opening of switch 46 the switch 48 is closed to thereby establish a power circuit from line 41 through switch 48, to power line 42 through the three parallel connected electromagnetic operating units or actuators 16, 38 and 39.

The energizing of electromagnetic valve actuators 38 and 39, closes the refrigerant supply valve 36 and the refrigerant discharge valve 37 thereby trapping or locking in passage 20 any refrigerant which may happen to be therein, and prevent any addition to or discharge of refrigerant from passage 20 and also preventing the further circulation of the refrigerant in passage 20.

The operation of the modified arrangement shown in Figure 2 would be the same as that described above.

At the same time that valves 36 and 37 are closed by actuators 38 and 39, scale lock actuator 16 is energized raising armature 17 and causing linkages 14 and 15 to pivot the scale lock 13 into unlocked position, releasing scale beam 7 to permit the weighing of the vat 1 with its content of milk and trapped refrigerant. As soon as such weight has been determined by the adjustment of scale poises 10 the milk may be withdrawn through valve 19 and thereafter the vat 1 with its content of trapped refrigerant reweighed, the difference between the two weights thus secured being the correct net weight of the milk withdrawn from vat 1.

After the vat has been emptied it may be cleaned and may then be reset for commencement of reuse by moving handles 74 and 75 to open switch 48 and close switch 46, open switch 66 and close switch 64.

The modified arrangement shown in Figure 3 of the drawings contemplates the substitution for scale 4 of an electrical type weight or force sensing, indicating, and recording device to which power is supplied from lines 41 and 42 through switch 76. Switch 76 is closed when actuator 16′ is energized. The energization of actuator 16 takes place in the same manner and after the same sequence of operations as described above with respect to the energization of actuator 16 of the device shown in Figure 1. The vat 1 and its associated refrigeration system and controls as shown in Figure 3 is the same as for Figure 1 only the weight sensing and indicating arrangement of the combination is different. Vat 1 of Figure 3 is, for illustration purposes only, shown as resting upon a supporting frame or platform 77. Force or weight sensing cells 78 are positioned to support the corners of frame 77. Obviously, the cells 78 could be positioned directly beneath the standards of the vat 1 and the frame 77 eliminated. Cells 78 are each connected by electrical cables 79 to a visual weight indicator 80 which is in turn connected by cable 81 to a weight recording unit 82.

An automatic force measuring or weighing or weight sensitive device of the type generally indicated in Figure 3 is disclosed in U. S. A. Patent No. 2,678,206. Obviously, other types of force measuring devices or weighing devices may be used and some such devices are also disclosed in U. S. A. Patents Nos. 2,545,118, 2,663,247 and 2,668,493. The weighing device may obviously be of the type utilizing electrical, pneumatic or mechanical principles of operation or a combination of such principles of operation.

In conclusion, it should be emphasized that from the foregoing description of this invention and from the accompanying drawings, it will be apparent that this invention realizes the introductorily enumerated objectives respecting the device for and process of storing, cooling, blending and accurately determining the weight of the cooled product, and which device possesses the hereinbefore listed and indicated advantages, and provides a new, unique and useful apparatus and process for storing, cooling, blending, and weighing.

To those familiar with the general art adapted in this invention it will be obvious that various weight or force sensing devices having balance beams, dials or other forms of intelligence conveying arrangements and being of the mechanical, electrical, or pneumatic type may be used to determine the weight. Similarly, it will also be obvious to those skilled in the pertinent arts that pneumatic or hydraulic or mechanical controls may be substituted, at least in part, for the illustrated electrical controls, and that in the instance of the use of pneumatic or like controls suitable valves would be substituted for the illustrated electrical switches. In each such instance, such revised devices could be caused to function in such a manner that, during the period from the first weighing operation when the cooled product is contained in the vat to the second weighing operation when the cooled product has been withdrawn from the vat, the weight of the refrigerant sensed by the scale at the initial weighing will be the same as the weight of the refrigerant sensed by the scale at the second weighing and that the operations of motors supported on the scale are discontinued during the entire weighing procedure, whereby to enable the accurate determination of the weight of the cooled product withdrawn from the vat.

Having thus described and illustrated an embodiment of this invention, the invention is not to be interpreted as being restricted to the specifically illustrated embodiments as set forth in the drawings and as hereinbefore specifically described, except insofar as is necessitated by the disclosure of the prior art and the appended claims.

The invention is claimed as follows:

1. A device for refrigerating and weighing milk, comprising in combination, a weighing scale having a balance beam, a lock for said balance beam, a milk storage tank supported by said weighing scale, said milk storage tank including passage means adapted for use in the circulation of refrigerant for cooling milk stored in said tank and having an inlet connection and an outlet connection, compressor and condenser means for refrigerant, refrigerant supply conduit means connected to said inlet connection for supplying refrigerant to said passage means from said compressor and condenser means and refrigerant discharge conduit means connected to said outlet connection for discharging refrigerant from said passage means to said compressor and condenser means, normally open valve means in said refrigerant supply conduit means and in said refrigerant discharge conduit means, agitator means extending into said storage tank and adapted for use in agitating milk stored in said storage tank, first electric motor means for driving said compressor and condenser means, second electric motor means for driving said agitator means, a first electric power supply circuit including an electric power source and a first switch for connecting said electric power source to said first electric motor means and to said second electric motor means, electromagnetic relay means adapted when energized to close said first switch, an electric power supply control circuit connected to said power source and including a second switch and including said relay means for energizing said relay means, electromagnetic valve actuator means for closing said valve means, electromagnetic lock actuator means for unlocking said lock, a second electric power supply circuit including said power source and a third switch connecting said power source to said valve actuator means and to said lock actuator means, sensing means disposed in said storage tank for sensing the condition of milk stored in said storage tank, control means including a fourth switch operably associated with said sensing means for opening and closing said fourth switch responsive to said sensing means, said fourth switch being connected in series with said second switch in said electric power supply control circuit, a fifth switch in the connection of said first electric power supply circuit to said first electric motor means operable to interrupt the supply of power to said first electric motor means, and a sixth switch connected in parallel to said fourth switch in said electric power supply control circuit.

2. A device according to claim 1, wherein said second switch and said third switch are joined by a single operating lever whereby to enable the simultaneous actuation of those switches, and wherein a single operating lever joins said fifth switch and said sixth switch to enable the simultaneous operation of those switches.

3. In a device of the type described, a weight sensitive device having a weight indicator, a lock for said weight indicator, an atmospheric receptacle for material to be attempered and weighed supported by said weight sensitive device, passage means adapted for use in the circulation of attempering medium in indirect heat exchange relation with material contained in said receptacle, said passage means having an inlet end and a discharge end, attempering medium supply means and discharge means for circulating attempering medium through said passage means, and attempering medium flow control means for controlling the establishment of operative communication between the inlet end and the discharge end of said passage means and the attempering medium supply means and discharge means.

4. In a device of the type described, an atmospheric receptacle for material to be weighed, a weight sensitive device having a weight indicator and being sensitive to the weight of said receptacle and the contents thereof, a lock for said weight indicator to prevent the functioning of said weight indicator when locked, passage means adapted for use in the circulation of attempering medium in indirect heat exchange relation with material contained in said receptacle, said passage means having an inlet end and a discharge end attempering medium supply means and discharge means for circulating attempering medium through said passage means, and flow control means for controlling the establishment of operative communication between the inlet end and the discharge end of said passage means and the attempering medium supply and discharge means.

5. A device for refrigerating and weighing material, comprising in combination, a weighing scale having a balance beam, a lock for said balance beam, a material storage tank supported on said weighing scale, said storage tank including passage means having inlet and outlet connections and adapted for use in circulation of refrigerant for cooling material stored in said storage tank, refrigerant supply conductor means and refrigerant discharge conductor means for supplying and discharging refrigerant to and from said inlet and outlet connections respectively, normally open valve means in said refrigerant supply conductor means and in said refrigerant discharge conductor means, agitator means extending into said storage tank and adapted for use in agitating material stored in said tank, electric motor means for driving said agitator means, a first electric power supply circuit including an electric power source and a first switch for connecting said power source to said electric motor means, electromagnetic relay means for closing said first switch when energized, an electric power supply control circuit connected to said power source and including a second switch and said relay means for energizing said relay means, electromagnetic valve actuator means for closing said valve means when said electromagnetic valve actuator means is energized, electromagnetic lock actuator means for unlocking said lock when said electromagnetic lock actuator means is energized, a second electric power supply circuit including said power source and a third switch connecting said power source to said electromagnetic valve actuator means and to said electromagnetic lock actuator means, temperature sensing means disposed in said storage tank for sensing the condition of material contained therein, control means including a fourth switch operably associated with said sensing means for opening and closing said fourth switch responsive to said sensing means, said fourth switch being connected in series with said second switch in said electric power supply control circuit, and a jumper switch connected in parallel to said fourth switch in said electric power supply control circuit.

6. A device for refrigerating and weighing materials, comprising in combination, a weighing scale having a balance beam, a lock for said balance beam, a material storage tank supported on said weighing scale, said storage tank including passage means having inlet and outlet connections and adapted for use in circulation of refrigerant for cooling material stored in said storage tank, refrigerant supply conductor means and refrigerant discharge conductor means for supplying refrigerant to and for discharging refrigerant from said inlet and said outlet connections respectively, normally open valve means in said refrigerant supply conductor means and in said refrigerant discharge conductor means, electromagnetic valve actuator means for closing said valve means, electromagnetic lock actuator means for unlocking said lock, and electric power supply circuit means including a power source and a switch connecting said power source to said valve actuator means and to said lock actuator means, said valve actuator means and said lock actuator means being connected to said power source in parallel.

7. Apparatus for cooling and weighing a product, comprising in combination, a weighing device having an intelligence indicating portion to indicate the weight supported by said weighing device, a weighing tank supported by said weighing device, said weighing tank having a passage for the circulation of cooling medium therethrough in heat exchange relation with the product to be cooled in said weighing tank, cooling medium supply and discharge means operatively connected through separate conduits to said passage means for the circulation of cooling medium through said passage means, agitator means extending into the product zone of said weighing tank adapted to agitate the product therein, electric motor means for driving said agitator means, normally open valve means in said separate conduits, normally locked lock means adapted to be moved into engagement with and lock said intelligence indicating portion of said weighing device, electromagnetic valve actuator means for driving said valve means into closed position when energized, electromagnetic lock actuator means for driving said lock means into unlocked position when energized, first electric power supply circuit means including first switch means for energizing said electric motor means for driving said agitator means, an electromagnetic relay for closing said first switch means when said relay is energized, second electric power supply and control circuit means including second switch means for energizing said electromagnetic relay, third switch means in said second electric power supply circuit means operable in response to temperature sensing means for interrupting the supply of power flowing to said electromagnetic relay when said temperature sensing means senses a temperature above predetermined value, and third electric power supply means including fourth switch means for simultaneously supplying electric power to said electromagnetic valve actuator means and to said electromagnetic lock actuator means.

8. Apparatus according to claim 7, having a fifth switch means connected parallel to said third switch means in said second electric power supply control circuit means, whereby said electromagnetic relay may be energized independent of said third switch means.

9. Apparatus according to claim 8, wherein said cooling medium supply and discharge means includes a compressor having an electric motor driving unit, said electric motor driving unit being connected to a source of electric power through said first electric power supply circuit means including said first switch means, and a sixth switch means for interrupting the supply of power flowing to said electric motor driving unit.

10. Apparatus according to claim 9, wherein said second and said fourth switch means are operatively connected to a single actuator for actuation in opposite order whereby when said second switch means is opened said fourth switch means is closed, and wherein said fifth switch means and said sixth switch means are operatively connected to a single actuator for actuation in opposite order whereby when said fifth switch means is closed said sixth switch means is opened.

11. A process for refrigerating and accurately determining the net total weight and accurately sampling a refrigerated liquid mixture consisting of separable ingredients which may be stored in a refrigerating and agitating type vat means which process comprises the steps of, confining the liquid mixture in said refrigerating and agitating type vat means and refrigerating the liquid mixture to a desired temperature by the circulation of a refrigerant in heat exchange relation to said liquid mixture, agitating the confined liquid mixture to secure a uniform blending of the ingredients thereof, stopping said circulation of a refrigerant and discontinuing the agitating of the confined liquid mixture, confining the refrigerant which was in heat exchange relation to said liquid mixture, weighing the refrigerating and agitating type vat means containing the refrigerated and blended liquid mixture together with any confined refrigerant, sampling the refrigerated liquid mixture, withdrawing the refrigerated liquid mixture from said refrigerating and agitating type vat means, reweighing said refrigerating and agitating type vat means and said confined refrigerant after the liquid mixture has been withdrawn, and subtracting the second mentioned weight from the first mentioned weight to determine the net weight of the refrigerated liquid mixture.

12. In an apparatus for weighing the refrigerated material content of a weighing tank, a tank, weighing means supporting said tank, said weighing means including weight indicating beam, refrigerant medium passage means embodied in said tank for refrigerating the material contents of said tank, refrigerant supply means for supplying refrigerant to said refrigerant medium passage means, refrigerant discharge means for discharging refrigerant from said refrigerant medium passage means, valve means for controlling the flow of refrigerant medium through said refrigerant supply means and through said refrigerant discharge means, lock means for locking said weight indicating beam in inoperable position, and actuator means for actuating said valve means and said lock means and being operable to simultaneously close said valve means and unlock said lock means, whereby any refrigerant medium in said refrigerant medium passage means is trapped therein when said weight indicating beam is unlocked and said weight indicating beam is operable for use in weighing the refrigerated material content of said tank.

13. A device for storing and attempering and weighing a product to be withdrawn from a storage container, comprising in combination, a weight responsive container support having a weight indicating portion, a container for product to be stored and attempered supported by said container support and including attempering medium passage means for the circulation of attempering medium for attempering the product stored in said container, supply connection means and discharge connection means for the supply and discharge respectively of attempering medium to and from said attempering medium passage means, normally open valve means for controlling the flow of attempering medium through said supply connection means and through said discharge connection means, and normally locked lock means for locking the indicating portion of said weight responsive container support, whereby upon the closing of said valve means and the unlocking of said lock means when the product stored in said container has been suitably attempered the net weight of the attempered product stored in said container and to be withdrawn therefrom may be accurately determined devoid of error resulting from the escape of attempering medium from said passage means by weighing said container and any content of attempered product together with any attempering medium confined in said attempering medium passage means before and after the withdrawal of the attempered product from said container and subtracting the second weight from the first weight.

14. A device according to claim 13, having electromagnetic means for simultaneously closing said valve means when energized and for unlocking said lock means when energized, a source of electric power, and switch means for connecting said source of electrical power to said electromagnetic means.

15. A device according to claim 13, having power responsive means for simultaneously closing said valve means and for unlocking said lock means, a source of power, and control means for controlling the supply of power to said power responsive means.

16. Apparatus for attempering and determining the weight of attempered product, comprising in combination, a weighing device including a balance mechanism, lock means for locking said balance mechanism in inoperable position, receptacle means supported by said weighing device for receiving product to be attempered and weighed, said receptacle means having attempering medium passage means for the circulation therethrough of attempering medium in heat exchange relation with the product in said receptacle means, attempering medium supply and discharge means operatively connected by supply and discharge conduit means to the opposite ends of said attempering medium passage means for the circulation of attempering medium therethrough, valve means operable between open and closed positions in said supply and discharge conduit means, valve operating means for said valve means for operating said valve means between open and closed positions, and lock operating means for said lock means for locking and unlocking said lock means, said valve operating means and said lock operating means being synchronized for substantially simultaneous operation so that when said valve operating means operates said valve means into closed position said lock operating means unlocks said lock means, whereby said attempering medium within said attempering medium passage will be trapped therein whenever said locking means for said balance means is unlocked to enable the weighing of the attempered product within said receptacle means while the attempering medium is locked within said attempering medium passage means.

17. Apparatus for attempering and weighing an attempered product in a single unit, comprising in combination, a load sensitive means for actuating an intelligence conveying device in response to the application of a load to said load sensitive means, an intelligence conveying device, a product receptacle supported at least in part by said load sensitive means, said product receptacle including heat exchange means for the exchange of heat between the product in said receptacle and attempering medium in said heat exchange means, conduit means for circulating heat exchange medium through said heat exchange means, valve means in said conduit means for preventing heat exchange medium from entering into and from discharging from said heat exchange means upon the closing of said valve means, valve actuating means for actuating said valve means between open and closed positions, and restraining means for said intelligence conveying device, actuator means for said restraining device operably synchronized with said valve actuating means, whereby upon the activation of said valve actuating means into valve means closing position said restraining means will release said intelligence conveying device to permit the determination of the weight of the refrigerated product contained in said receptacle devoid of the effect of circulating refrigerant.

18. Control apparatus for weighing devices having a refrigerated compartment for the product to be weighed, comprising in combination, a weighing device, a product compartment supported upon said weighing device and having refrigerant passage means for the circulation of refrigerant in heat exchange with the product in said compartment, refrigerant supply and discharge means operatively connected to said refrigerant passage means for the circulation of refrigerant through said passage means, valve means movable between open and closed flow controlling positions for controlling the flow of refrigerant circulating through said refrigerant passage as the refrigerant is received from and returned to said refrigerant supply and discharge means, valve operating means for moving said valve means between said open and closed flow controlling positions, weighing device lock means movable between operation control positions of said weighing device, lock operating means for moving said lock means between said operating control positions, said lock operating means moving said lock into weighing device release position simultaneously with the action of said valve operating means in moving said valve means into closed position and moving said lock into scale locked position simultaneously with the action of said valve operating means in moving said valve means into open position.

19. In combination, weight determining means adapted to support and weigh a storage chamber means and the content thereof, storage chamber means supported by said weight determining means, attempering medium passage means adapted to establish heat exchange relation between attempering medium flowing through said attempering medium passage means and the contents of said storage chamber means, supply conduit means for supplying attempering medium to said attempering medium passage means, discharge conduit means for discharging attempering medium from said attempering medium passage means, attempering medium circulating means adapted to cause the circulation of attempering medium through said supply conduit means and through said attempering medium passage means and through said discharge conduit means, valve means in said supply conduit means and in said discharge conduit means, weight indicating means comprising part of said weight determining means, restraining means adapted to restrain the operation of said weight indicating means, and prime mover means for simultaneously closing said valve means and for inactivating said restraining means.

20. A device according to claim 19, wherein said attempering medium passage means comprises part of said storage chamber.

21. A device according to claim 19, wherein said circulating means is supported by said weight determining means.

22. A method for refrigerating and accurately determining the net total weight of a refrigerated material, comprising the steps of, confining and refrigerating the material to a desired temperature under atmospheric pressure in a confining means open to the atmosphere, stopping the refrigerating action and confining the refrigerant, determining the combined weight of the thus confined refrigerated material and the confined refrigerant, withdrawing the confined and refrigerated material, determining the separate weight of the confined refrigerant, and subtracting the weight of the confined refrigerant from the combined weight of the refrigerated material and the confined refrigerant.

23. Apparatus for attempering material and determining the net weight of the attempered material, comprising in combination, confining means open to the atmosphere for confining under atmospheric pressure the material to be attempered and weighed, attempering means for the circulation of attempering medium in indirect heat exchange relation to the thus confined material, passage means for confining the attempering medium circulating through said attempering means, weight determining means for determining first the combined weight of the attempered material and the confined attempering medium and for subsequently determining the weight of the attempering medium after the attempered material has been withdrawn from the confining means.

24. Apparatus for storing and attempering and weighing material, comprising in combination, a weighing device having a weight indicator, an inactivator for inactivating said weight indicator, a storage receptacle supported by said weighing device and including passage means for the circulation of attempering medium in heat exchange relation with material stored in said storage receptacle, circulating means for circulating attempering medium through said passage means, driving means for operating said circulating means, an actuator for said inactivator for releasing said weight indicator from the inactivator, and control means for substantially simultaneously stopping said driving means and actuating said actuator, whereby said circulating means is inoperative whenever said weight indicator is free to operate.

25. Apparatus according to claim 24, wherein said driving means is an electric motor and wherein said actuator is an electromagnetic device, and wherein said control means comprises electric switch mechanism adapted to simultaneously de-energize said electric motor and energize said electromagnetic device.

26. A method for attempering and accurately determining the weight of attempered material, comprising the steps of, attempering the material to a desired temperature through indirect heat exchange with atttempering medium while the material is confined in a confining means open to the atmosphere and while the confined material is so supported upon weight sensitive means as to enable the determination of the weight of the thus confined material, confining the attempering medium which is in indirect heat exchange relation with the confined and attempered material in such indirect heat exchange relation, and then determining the weight of the attempered material while the material remains thus confined.

27. Apparatus for attempering material and determining the weight of the attempered material, comprising the combination, confining means open to the atmosphere for atmospherically confining material to be attempered and weighed, attempering medium circulating means for circulating attempering medium in indirect heat exchange relation with the confined material to be attempered in said confining means, said circulating means being devoid of direct communication with the material to be attempered, control means for confining the attempering medium which is in indirect heat exchange relation with the confined material in such indirect heat exchange relation, weight sensitive means so constructed and arranged and so supporting at least in part said confining means and the material confined therein as to enable determination of the weight of the confined material.

28. A process for cooling and accurately determining the weight of and sampling cooled liquid mixture, consisting of separable ingredients, comprising the steps of, confining the liquid mixture in a cooling and agitating type receptacle and cooling the liquid mixture to a desired temperature by indirect heat exchange with a cooling medium while the liquid mixture is thus confined, agitating the confined and cooled liquid mixture to secure a uniform blending of the ingredients thereof, confining the cooling medium which is in indirect heat exchange relation with the cooled liquid mixture in such indirect heat exchange relation, discontinuing the agitation of the cooled and confined liquid mixture, weighing said receptacle and its contents of confined and cooled and blended liquid mixture and the confined cooling medium, sampling the cooled and blended liquid mixture, withdrawing the cooled liquid mixture from said receptacle, and determining the weight of the withdrawn cooled and blended liquid mixture.

29. A device for storing and attempering and weighing a product in a storage container, comprising in combination, a weight sensing container support having a weight indicator, a container for a product to be stored and attempered, said container being supported in weight sensing arrangement upon said container support, passage means for attempering medium for placing attempering medium in indirect heat exchange relation with product stored in said container, supply means for supplying attempering medium to said passage means while the product is stored in said container, discharge means for discharging attempering medium from said passage means, supply control means for controlling the movement of attempering medium through said supply means into said passage means, discharge control means for controlling the flow of attempering medium from said passage means to said discharge means, indicator restraining means for normally rendering inoperable said weight indicator, whereby upon the actuation of said supply control means and said discharge control means to stop the movement of attempering medium through said supply means into said passage means and to stop the discharge of attempering medium from said passage means into said discharge means followed by restoring the operability of said weight indicator the weight of the attempered product stored in said container may be determined from said indicator by deducting the weight of the empty container and the confined attempering medium from the combined weight of the container and the stored material and the confined attempering medium.

References Cited in the file of this patent

UNITED STATES PATENTS

| | | |
|---|---|---|
| 1,660,110 | Ward | Feb. 21, 1928 |
| 2,018,857 | Kniskern | Oct. 29, 1935 |
| 2,075,408 | Sholes | Mar. 30, 1937 |
| 2,529,394 | Hull | Nov. 7, 1950 |
| 2,580,567 | Martin | Jan. 1, 1952 |